United States Patent
Kátay

(10) Patent No.: US 7,754,642 B2
(45) Date of Patent: Jul. 13, 2010

(54) HYDROPHOBIC OIL ADSORBENT MATERIAL AND PROCESS FOR PRODUCTION AND USE

(75) Inventor: János Kátay, Gyula (HU)

(73) Assignee: Sineol Hungary KFT., Budapest (HU)

( * ) Notice: Subject to any disclaimer, the term of this patent is extended or adjusted under 35 U.S.C. 154(b) by 0 days.

(21) Appl. No.: 12/279,875

(22) PCT Filed: Mar. 2, 2007

(86) PCT No.: PCT/HU2007/000017

§ 371 (c)(1),
(2), (4) Date: Aug. 19, 2008

(87) PCT Pub. No.: WO2007/099381

PCT Pub. Date: Sep. 7, 2007

(65) Prior Publication Data

US 2009/0137384 A1    May 28, 2009

(30) Foreign Application Priority Data

Mar. 3, 2006   (HU) .................................. 0600175

(51) Int. Cl.
*B01J 23/02* (2006.01)
*B01J 31/04* (2006.01)
*B01J 20/22* (2006.01)
*B09B 3/00* (2006.01)
*B09B 1/00* (2006.01)

(52) U.S. Cl. ................ 502/151; 502/340; 502/161; 502/401; 502/150; 502/172; 502/170; 502/162; 588/250

(58) Field of Classification Search ............ 502/150, 502/151, 161, 162, 170, 172, 340, 401; 588/250
See application file for complete search history.

(56) References Cited

U.S. PATENT DOCUMENTS

| 2,613,181 A | 10/1952 | Green et al. |
| 4,440,867 A * | 4/1984 | Sabherwal .................... 502/62 |
| 6,111,120 A * | 8/2000 | Myers ......................... 554/189 |

FOREIGN PATENT DOCUMENTS

| DE | 2 339 143 A1 | 6/1974 |
| DE | 195 27 006 A1 | 12/1996 |
| EP | 0 121 613 A1 | 10/1984 |
| JP | 7-136645 A | 5/1995 |

OTHER PUBLICATIONS

"Calcium oxide," Dictionary.com definition. Visited at http://dictionary.reference.com/browse/calcium+oxide on Sep. 17, 2009.*
"Chalk," Dictionary.com definition. Visited at http://dictionary.reference.com/browse/chalk on Sep. 17, 2009.*
"Fats, Oils, Fatty Acids, Triglycerides," Antonio Zamora (2005). Visited at http://www.scientificpsychic.com/fitness/fattyacids1.html on Sep. 18, 2009.*
C. Solisio et al., "Removal of Exhausted Oils by Adsorption on Mixed Ca and Mg Oxides", Water Research, vol. 36, No. 4 (2002) pp. 899-904.
International Search Report of PCT/HU2007/000017 (Jul. 11, 2007).

* cited by examiner

*Primary Examiner*—Timothy C Vanoy
*Assistant Examiner*—Daniel Berns
(74) *Attorney, Agent, or Firm*—Millen, White, Zelano & Branigan, P.C.

(57) ABSTRACT

Disclosed are a hydrophobic oil-adsorbent material that is capable of adsorbing oil and separating oil from water and methods for production and application of said material, suitable for collecting and removing hydrocarbons and other contaminations of oil content from solid surfaces and water.

20 Claims, No Drawings

HYDROPHOBIC OIL ADSORBENT MATERIAL AND PROCESS FOR PRODUCTION AND USE

The subject of the invention is a hydrophobic, oil-adsorbent material separating oil from water as well as methods for production and application of said material, suitable for collecting and removing hydrocarbons and other contaminations of oil content from solid surface and water as well.

Nowadays collection and offsetting of oil contamination in industry particularly in various areas of oil industry means an ever-increasing problem. This task often presents itself in case of accidents and natural disasters as well when oil contamination from the spot of the disaster must be collected, respectively removed. Collection and offsetting of waste of vegetable oil content occurring in industry and households in big quantities present in the environment mean a grave problem as well.

A peculiar group of substances of indirect effect polluting flowing waters among surface waters, as they block or exclude the physical elements of water life. Among others they block breathing by physical ways, close waters from light and inhibit the penetration of sunshine, create coatings on inferior organisms. The oil in the water sticks on the microorganisms and kills them by partly physical, partly chemical ways. Even a tenth or a hundredth mg/liter concentration in water might cause harmful effect on living organisms. The animal kingdom of water environment is endangered to a bigger extent by crude oil contamination than the microorganisms. So in case of fish the contamination on the surface of water blocks oxygen absorption and sticking on the skin causes dermatological problems.

Oil and its derivatives in collective name hydrocarbons are the most common and frequent (37.4%) types of extraordinary contamination. Oil spills spread quickly in water unless meeting obstacles, creating a thin film-like layer, then an oil-cover of approximately 1 mm thickness is formed. In clear water this cover spreads and gradually turns into spills of smaller than 0.2 mm thickness. Polluted water might hinder spread of oil-film and then the layer thickness eventually forming remains around 1 mm. The smallest layer thickness that can be visually perceived is mm which means hardly more then 40 liter oil on a 1 km$^2$ surface.

It is obvious from the above, that all forms of oil contamination of waters is harmful. The oil layer floating on the surface hinders natural oxygen turnover of waters and so it has harmful effect both on breathing and photosynthesis. Even in small quantities oil can close water surface and by this blocks both natural oxygen intake from the atmosphere and exit of gases produced by metabolism to the atmosphere developed there. These products remain in the water and shift reversible biochemical processes into harmful direction.

During oil contamination physical, chemical and biological process series start, determining the extent of the harmful effect on the living organisms of the water. Here the time factor is very important. The current salvage processes take a lot of time and their efficiency is not up to the necessary standard, for example in case of skimmed walls, caissons, etc.

In the state of the art currently mainly sand and besides much more seldom chopped plants of good absorbing capacity and of loose structure (for example ground corncob), natural minerals (for example pearlite), respectively in case of waters skimmed walls are used for providing against oil pollution.

The HU 183 410 Hungarian patent description describes a method for producing solid hydrophobic material in the state of the art for the removal of hydrocarbon contamination of water. During the method described in the above organic or inorganic solid material of powder or granular shape—preferably natural or artificial silicate or aluminum silicate, burnt clay, alkali-earth metal oxide or alkali-earth metal carbonate, coal or organic fiber material—are reacted with monomer or monomers—preferably with ethylene, propylene or styrene—in given case in the presence of an initiator of polymerization or catalyst and form a hydrophobic polymer coating of 0.5-700 weight % quantity on the surface of the solid material in proportion of the weight of the solid material. Hydrocarbon contamination of hydrophilous materials (primarily oil contamination of living water can be quickly and efficiently absorbed, the substance of oil content can be easily separated from the treated hydrophilous material and the absorbed oil content of the solid material can be retrieved.

The HU 171283 Hungarian patent description makes known procedure for cleaning industrial sewage containing hydrophobic material. During the procedure the industrial sewage containing hydrophobic organic materials, mainly oil and/or fats in emulsion form and/or in roughly dispersed form is mixed in a mechanical way, with an intake of electrofilter ash breaking the emulsion promptly. The oil and/or fat emulgeated earlier are absorbed then the dispersed oil and/or fat present in given case are absorbed. Finally the clean water is removed after the settling of the ash containing oil and/or fat.

The JP 7136645 Japanese patent description makes known a method for offsetting industrial sewage containing oil. During the method bentonit or zeolit powder is mixed with an oil-adsorbent or active coal and the mixture is ground with the help of a grinding mill to such an extent, that ultra-fine granules of 3 µm particle size are created reinforcing adsorbing effect and cleaning the sewage, respectively drinking water. Besides recirculation of the adsorbent is realized by drying respectively retrieving the precipitated residue.

Drawbacks of the solutions mentioned:

A great quantity of material is needed for the application making difficult the transport and handling of the material.

The oil contamination can not be entirely removed, as these materials can adsorb oil on their surface partially only, so the remaining oil contamination as well as the residue of the material making harmless means an additional risk of danger, for example pollution in water, respectively skidding of vehicles on roads.

They require great physical effort, for example the moving of the sand.

The material making harmless contaminated with oil damages the environment further, their storing or elimination involves considerable expenses.

They can not be used on water or on watery surface, because they can not separate water from oil.

When working out the solution according to the invention we aimed to develop a material with significantly greater oil absorbing capacity than the materials in the state of the art, it can be applied efficiently in small quantities as well and during their elimination they pollute the environment in the possible smallest extent, as well they are able to separate oil from water and so can be applied on water and solid watery surface as well.

When realizing the solution according to the invention we recognized, that in case during preparing the adsorbent material, ground and dried calcium oxide of 29.3-86.2 mass percent, preferably 39.1-72.84 mass percent is applied as raw material, with an auxiliary material of 3.45-11.75 mass percent, preferably 4.12-9.21 mass percent fluid adsorbent agent and fluid catalyst is added with steady mixing and under given pressure, the composition of which is 2.95-7.75 mass percent, preferably 4.15-5.85 mass percent of fluid adsorbent agent and 1.2-3.4 mass percent, preferably 1.34-1.76 mass percent of fluid catalyst, furthermore water and stabilizer of 18.25-55.75 mass percent, preferably 26.55-48.45 mass percent is added to the mixed and steadily compounded materials during additional steady mixing then after chemical reaction took place the ready material is dehydrated left to steadily cool down and let it rest for 24-48 hours, then the set aim can be achieved.

The invention is a method for the production of a hydrophobic adsorbent material separating oil from water and binding it during which the adsorbent material is made from a CaO base raw material with an auxiliary material and during preparing the adsorbent material, ground and dried CaO is used, which is characterized by that, during preparing the adsorbent material 29.3-86.2 mass percent, preferably 39.1-72.84 mass percent of ground and dried CaO is applied as raw material, and during steady mixing 3.45-11.75 mass percent, preferably 4.12-9.21 mass percent of liquid adsorbent agent and liquid catalyst are added as auxiliary materials, the composition of which is 2.95-7.75 mass percent, preferably 4.15-5.85 mass percent of liquid adsorbent agent and 1.2-3.4 mass percent, preferably 1.34-1.76 mass percent of liquid catalyst, then during additional steady mixing 18.25-55.75 mass percent, preferably 26.55-48.45 mass percent of water and stabilizer are added to the well mixed and steadily blended material, then after the chemical reaction the ready adsorbent material is dehydrated, emptied and left to cool evenly and let it rest for 24-48 hours, and the composition of the adsorbent agent applied during the method is:

| component | volume percentage |
| --- | --- |
| Palmitic acid | 2.75-6.75% |
| Stearic acid | 0.75-3.75% |
| Oleic acid | 30-97.50% |
| Linoleic acid | 9.00-33.00% |
| Linolenic acid | 3.50-15% |
| Erucidic acid | <3% | furthermore the composition of the catalyst applied during the method is:

| component | volume percentage |
| --- | --- |
| Ethyl alcohol | 45-97% |
| Denaturant | 0.1-0.50% |
| Catalyst additive | 3.00-54.5% | in which the composition of the catalyst additive is:

| component | volume percentage |
| --- | --- |
| Benzine | 33.75%-90% |
| Benzol | 10-30% |
| Pyridine | 3.75-11.25% |
| Methanol | 2.5-7.5% | and the stabilizer used during the method is potassium silicate with a quantity of 0.01-0.002 mass % proportioned to the total mass of materials applied during the method.

In a preferred application of the method according to the invention the composition of the adsorbent agent applied during the method is:

| component | volume percentage |
| --- | --- |
| Palmitic acid | 2.75-6.75% |
| Stearic acid | 1.15-3.25% |
| Oleic acid | 41-87.5% |
| Linoleic acid | 11.6-28.6% |
| Linolenic acid | 4.85-13.15% |
| Erucidic acid | <1.5% | and the composition of the catalyst is:

| component | volume percentage |
| --- | --- |
| Ethyl alcohol | 63-95% |
| Denaturant | 0.14-0.3% |
| Catalyst additive | 4.7-36.7% | in which the composition of the catalyst additive is:

| component | volume percentage |
| --- | --- |
| Benzine | 47.25-80% |
| Benzol | 14-26% |
| Pyridine | 5.25-9.75% |
| Methanol | 3.5-6.5% |

In a further preferred application of the method according to the invention the raw material applied is 56.8 mass % ground, dried CaO to which a liquid emulsion auxiliary material of 4.5% mass percent adsorbent compound and 2.2 mass percent catalyst is mixed, then 36.5 mass percent water is fed to the well mixed compound, and the composition of the applied adsorbent agent is:

| component | volume percentage |
| --- | --- |
| Palmitic acid | 4-5% |
| Stearic acid | 1.5-2.5% |
| Oleic acid | 60-65% |
| Linoleic acid | 18-22% |
| Linolenic acid | 7-10% |
| Erucidic acid | <2% | and the composition of the catalyst is:

| component | volume percentage |
|---|---|
| Ethyl alcohol | 90% |
| Denaturant | 0.2% |
| Catalyst additive | 6-9.8% | and the composition of the catalyst additive in volume proportion is:

| component | volume percentage |
|---|---|
| Benzine | 67.5% |
| Benzol | 20% |
| Pyridine | 7.5% |
| Methanol | 5% |

In a further preferred application of the method according to the invention as auxiliary material, preferably a 2:1 volume rate emulsion of physically mixed liquid adsorbent agent and liquid catalyst is used.

In a further preferred application of the method according to the invention preparing of the adsorbent material and mixing of components take place in a rotary mixer.

In a further preferred application of the method according to the invention feeding of the adsorbent agent and catalyst as auxiliary materials takes place at great pressure to ensure even compounding, blending, preferably at 3-6 bar, in given case at 5 bar pressure.

In a further preferred application of the method according to the invention during preparing the adsorbent material even blending is ensured during the chemical reaction taking place after feeding the water.

In a further preferred application of the method according to the invention the particle size of ground CaO applied as raw material is 0.05-50 mm, preferably 0.1-0.5 mm.

The invention is further a hydrophobic adsorbent material, separating oil from water and binding it characterized by that, the product is made by any of the methods according to the invention.

The invention is further a method for applying the hydrophobic adsorbent material separating oil from water, adsorbing oil according to primarily any of the methods according to the invention, during which method the oil-adsorbing adsorbent material is put to the area polluted by oil, characterized by that, that the adsorbent material is used for removing oil contamination on solid surface for example on concrete, asphalt, steel floor, or on ground, in such a way, that preferably 1.8 g adsorbent material is used for making one gram oil contamination harmless, and said adsorbent is spread or dispersed on the oil contamination, then the arisen solid granule can be removed by sweeping or any other known method.

The invention is further a method for applying the hydrophobic material separating oil from water, adsorbing oil according to primarily any of the methods according to the invention, during which method the oil-adsorbing adsorbent material is put to the area polluted by oil, characterized by that, that the adsorbent material is used for removing oil that became solid in the environment of oil producing plants, oil-rigs, oil refineries, racking off places, repair shops in such a way that liquid hydrocarbon, for example oil is sprinkled on the polluted area and after loosening the solid oil contamination the adsorbent material is put there, then after the adsorbent material adsorbed and bound the already loosened oil contamination, then it is removed as solid waste in the traditional way.

The invention is further a method for applying the hydrophobic adsorbent material separating oil from water, adsorbing oil according to primarily any of the methods according to the invention, during which method the oil-adsorbing adsorbent material is put to the area polluted by oil, characterized by that, that the adsorbent material is used for removing oil from hazardous places like power stations, nuclear power plants, respectively as protective cover placed before or after reparation or maintenance works in outdoor sites.

The invention is further a method for applying the hydrophobic adsorbent material separating oil from water, adsorbing oil according to primarily any of the methods according to the invention, during which method the oil-adsorbing adsorbent material is put to the area polluted by oil, characterized by that, that the adsorbent material is used for removing oil from oil slicks in water in such a way that adsorbent material is put on the surface of the polluted water in a rate of 1:<1.8 in proportion of the mass of oil contamination, and the adsorbent material together with the adsorbed oil remain floating on the water and can be removed with the known methods, floating dams, pumping, etc., and in given case the oil contamination adsorbed by the adsorbent material can be separated from the water in a proper container for this purpose.

The invention is further a method for applying the hydrophobic adsorbent material separating oil from water, adsorbing oil according to primarily any of the methods according to the invention, during which method the oil-adsorbing adsorbent material is put to the area polluted by oil, characterized by that, that the adsorbent material is used for removing oil from water in such a way, that adsorbent material is put on the surface of the water in a rate of 1:1.8 or in greater rate in proportion of the mass of oil contamination, and the adsorbent material together with the adsorbed oil sinks below the surface of the water and forms a material in the water bed, that gets set, compact and solid in time.

In a further preferred application of the method according to the invention the making harmless of the oil contamination in the adsorbent material takes place by burning or centrifuging or it is stored in small quantities as hazardous waste.

The method for producing adsorbent material according to the invention is set forth by the following examples:

EXAMPLE 1

During a preferable application of the method according to the invention 45 mass percent of ground dried calcium oxide is applied as raw material, and a fluid emulsion of auxiliary materials of 7 mass percent of adsorbent agent and 3 mass percent catalyst is mixed to it, then 45 mass percent of water and stabilizer is added to this well mixed compound.

Composition of the adsorbent agent applied during the method:

| component | volume percentage |
|---|---|
| Palmitic acid | 2.75-6.75% |
| Stearic acid | 0.75-3.75% |
| Oleic acid | 30.00-97.50% |
| Linoleic acid | 9.00-33.00% |
| Linolenic acid | 3.50-15.99% |
| Erucidic acid | <3.00% |

Composition of the catalyst applied during the method:

| component | volume percentage |
|---|---|
| Ethyl alcohol | 45.00-97.00% |
| Denaturant | 0.10-0.50% |
| Catalyst additive | 3.00-54.50% | wherein the composition of the catalyst additive is:

| component | volume percentage |
|---|---|
| Benzine | 33.75-90.00% |
| Benzol | 10.00-30.00% |
| Pyridine | 3.75-11.25% |
| Methanol | 2.50-7.50% |

The stabilizer used during the method is potassium silicate with a quantity of 0.008 mass % proportioned to the total mass of materials applied during the method.

EXAMPLE 2

A further preferable application of the method according to the invention is when 68 mass percent of ground dried calcium oxide is applied as raw material, and a fluid emulsion of auxiliary materials of 3.8 mass percent of adsorbent agent and 3.2 mass percent of catalyst is added, then 25 mass percent of water and stabilizer is added to this well mixed compound.

The composition of the adsorbent agent applied in a further preferable application of the method according to the invention is:

| component | volume percentage |
|---|---|
| Palmitic acid | 3.00-3.75% |
| Stearic acid | 1.15-3.25% |
| Oleic acid | 41.00-87.50% |
| Linoleic acid | 11.60-28.60% |
| Linolenic acid | 4.85-13.15% |
| Erucidic acid | <1.5% | composition of the catalyst applied in case of preferable application:

| component | volume percentage |
|---|---|
| Ethyl alcohol | 63.00-95.00% |
| Denaturant | 0.14-0.30% |
| Catalyst additive | 4.70-36.70% | wherein the composition of the catalyst additive in case of preferable application is:

| component | volume percentage |
|---|---|
| Benzine | 47.25-80.00% |
| Benzol | 14.00-26.00% |
| Pyridine | 5.25-9.75% |
| Methanol | 3.50-6.50% |

The stabilizer used during the method is potassium silicate, with 0.003 mass % quantity in proportion with the total mass of the materials applied during the method.

EXAMPLE 3

A further preferable application of the method according to the invention is when 56.8 mass percent of ground dried calcium oxide is applied as raw material, and a fluid emulsion of auxiliary materials of 4.5 mass percent of adsorbent agent and 2.2 mass percent of catalyst is added, then 36.5 mass percent of water and stabilizer is added to this well mixed compound.

The components of the applied adsorbent agent are:

| component | volume percentage |
|---|---|
| Palmitic acid | 4.00-5.00% |
| Stearic acid | 1.50-2.00% |
| Oleic acid | 60.00-65.00% |
| Linoleic acid | 18.00-22.00% |
| Linolenic acid | 7.00-10.00% |
| Erucidic acid | <2.00% |

Composition of the catalyst applied is:

| component | volume percentage |
|---|---|
| Ethyl alcohol | 90.00-97.00% |
| Denaturant | 0.20-0.50% |
| Catalyst additive | 6.00-9.8% | and the composition of the catalyst additive in volume proportion:

| component | volume percentage |
|---|---|
| Benzine | 67.50% |
| Benzol | 20.00% |
| Pyridine | 7.50% |
| Methanol | 5.00% |

The stabilizer used during the method is potassium silicate, with 0.004 mass % quantity in proportion with the total mass of the materials applied during the method.

Another preferable application of the method according to the invention is when an emulsion of 2:1 volume rate of auxiliaries of adsorbent agent and fluid catalyst mixed physically is applied.

During the method the preparation of the adsorbent material and blending of the components takes preferably part in a rotary drum mixer.

Feeding of the adsorbent agent and catalyst used as auxiliaries takes place at great pressure, at 3-6, preferably at 5 bar pressure to ensure steady blending.

In a preferable application during the method according to the invention steady mixing is furthermore ensured after the chemical reaction resulting from water feeding. The particle size of the ground dried calcium oxide used as raw material is 0.05-50 mm, preferably 0.1-0.5 mm.

A possible application of the method and adsorbent material according to the invention as well as a possible producing method are set forth by the following example:

25 kg (56.8% of the total raw materials) ground dried calcium oxide of 2 mm particle size is fed into a rotary drum mixer in slanted position, preferably at 20° C. as raw material, then the opening of the mixer is covered in such a way, that the opening in the crab in the middle of the lid offers access to the inside of the mixing space. The volume of the mixer should be determined so, that the materials fed into it should not take more than 25% of the mixing space. It is partly necessary to avoid an explosion resulting from the great intensity and speed of the chemical reaction, partly because this is the quantity that can effectively take part in the process. Due to the fulminant reaction proper amount of time should be allowed for every part of the mixture to take part in the chemical process during the short time. If bigger quantity is fed, than not the whole part of the mixture is involved, so the effect can not be satisfactory.

During steady mixing 3 liter of liquid auxiliary material is sprayed through the lid opening with a tube provided with a sprinkler with 5 bar pressure. The auxiliary material consists of adsorbent agent and catalyst formerly comprised and mixed into an emulsion (6.7 mass % of the total raw material). The volume rate of the adsorbent agent and catalyst is 2:1 in the auxiliary material. This way the auxiliary material is properly mixed with the raw material during steady mixing.

Composition of the auxiliary material in the mass % of the total raw material:

The volume rate of the adsorbent agent and catalyst in the auxiliary material is 2:1 in emulsion form.

|  | rate | volume |
| --- | --- | --- |
| adsorbent agent | 4.5 mass % | 2 liter |
| catalyst | 2.2 mass % | 1 liter |
| total: | 6.7 mass % | 3 liter | composition of the adsorbent agent:

| component | volume percentage |
| --- | --- |
| Palmitic acid | 4.00-5.00% |
| Stearic acid | 1.50-2.00% |
| Oleic acid | 60.00-65.00% |
| Linoleic acid | 18.00-22.00% |
| Linolenic acid | 7.00-10.00% |
| Erucidic acid | <2.00% |

Composition of the catalyst is:

| component | volume percentage |
| --- | --- |
| Ethyl alcohol | 90.00-95.00% |
| Denaturant | 0.20-0.40% |
| Catalyst additive | 6.00-8.5% |

Composition of the catalyst additive:

| component | volume percentage |
| --- | --- |
| Benzine | 67.50% |
| Benzol | 20.00% |

-continued

| component | volume percentage |
| --- | --- |
| Pyridine | 7.50% |
| Methanol | 5.00% |

The stabilizer used during the process is potassium silicate in 0.005 mass % quantity in the proportion of the total mass of material applied during the process.

Then 14-17 liter water with stabilizer (36.5 weight % of the total raw material) is fed to the mixer in continuous rotation through the slit on the lid with a pressure of 2 bar—as quickly as possible—preferably in 10 seconds. Then the lid on the opening of the mixer is removed, the mixer goes on two or three more turns in slanted position. Then the mixer is stopped and the mixing container is set in vertical position and a dust and steam removing equipment, an extractor fan is joined the opening of the mixer. The extractor fan joins loosely the mixing container preventing bigger pressure in the mixer resulting in explosion. The loose connection is compensated by the artificial sucking effect of the extractor fan. This way neither the hot steam nor the dust can get into the working space.

Resulting from the water feeding a chemical reaction developing heat takes place at almost 600° C. helped by the catalyst. The dry material content of the adsorbent material helps to achieve the proper temperature as well, which can be optimized by adding thickening additive. During the reaction the particle size of the raw material disintegrates and a white powder of 5-10 micron particle size is formed. These particles are coated by the adsorbent material, as if burnt to the particles. This process is also helped by the catalyst. At the same time with the reaction steam is developing and the part of the water fed that did not take part in the reaction quits with the help of the extraction fan. In this phase of the reaction it is possible to entrap the heat of high temperature with the help of a range of pipes filled with water. The heat entrapped this way can be used for various purposes, eg. heating rooms. As a result of the high temperature dehydration of the ready adsorbent material takes place as well.

Then the ready adsorbent material is removed from the mixing container and let it cool down evenly and let it rest for 48 hours. During the even cooling the crystal structure is formed in the adsorbent material, that results in the adsorbing effect. The adsorbent material made this way is a light white powder with strong binding and adsorbing effect with specific gravity of 0.58 kg/dm$^3$. The volume of one kilogram of adsorbent material is: 1.73 dm$^3$.

During the chemical reaction high surface tension arises in the adsorbent material resulting in strong water-repellent effect, not allowing water to come near the adsorbent material, so the impact is directed towards adsorption of petroleum, petroleum derivatives and vegetable oils only.

This way during the production of the adsorbent material according to the invention during mixing of the adsorbent agent, the catalyst and the water resulting in a chemical reaction with heat developing, during which with the help of calcium oxide, adsorbent agent and catalyst they get into chemical mutual reaction resulting in an adsorbent material with strong adsorbing, water-repellent effect of unique crystal structure. The particle size of the calcium oxide used can be increased up to a range of a few centimeters, because during the chemical reaction the particles of the calcium oxide disintegrate and eventually the size of 5-10 micron characteristic of the end product is achieved.

The application of the adsorbent material according to the invention is set forth by the examples as follows:

Example of Application 1:

Removal of oil contamination from solid surface. In case there is no water present on the solid surface for example on concrete, asphalt, steel floor or ground surface, only oil contamination, then 1.8 g adsorbent material is needed for 1 g oil contamination to be spread or dispersed on it. The adsorbent material adsorbs the oil contamination spread over the surface within a few minutes forming a solid granule easy to remove by sweeping or any other known method.

Example of Application 2:

In the environment of oil production, rigs, oil refineries, racking off places, repair shops, oil pollution which became oil-mud in the meantime is a constant problem and risk of accidents. Currently their removal is difficult, by scraping with approximately 50% efficiency. With the help of the adsorbent material according to the invention its removal can be easily sold by such a way, that liquid hydrocarbon, for example oil is poured on the contaminated area, after loosening the bound oil contamination the adsorbent material is applied. The adsorbent material adsorbs the oil contamination already loosened and binds it, which can be removed in the traditional way as solid waste. With this method bound contamination present for a long time can be removed with 100% efficiency.

Example of Application 3:

In case of making harmless the oil contamination with traditional methods, for example with sand, there is always the risk of flame up, inflaming, especially near hazardous workplaces, power stations, nuclear power plants. With the application of the adsorbent material according to the invention there is a possibility of placing a kind of protective cover which can bind the oil contamination at once, by this preventing the direct danger of inflaming.

The same method can be applied in case of repair and maintenance works on open spots, where on the site of repair a protective cover of the adsorbent material according to the invention is preliminary placed to directly catch the oil contamination and prevents its getting into the soil.

Example of Application 4:

In case of water pollution by oil adsorbent material in the rate of 1:<1.8 in proportion with the mass of the oil pollution can be applied to make the oil pollution harmless. Then the adsorbent material floats on the water, so it can be removed with the known methods from the surface of the water, with floating dams, pumping out etc. This frequently happens in case of shipwrecks near the coast, or in ports, docks when it is imperative to remove the contamination from the water. In case of oil pollution at sea of great extent the oil contamination bound by the adsorbent material according to the invention can be removed from the water by pumping and can be separated from the water in a container applied for this purpose. This solution is quick, cheap and extremely efficient.

Example of Application 5:

In case of oil pollution in water adsorbent material in the rate of 1:1.8 in proportion with the mass of the oil pollution can be applied to make the oil pollution harmless.

The adsorbent together with the oil bound sink under the water surface and create a material in the bed that will set in time. This bound and sank oil will compact, set and become a coral in the sea not exposing any polluting factor any more for the animal kingdom of the sea. The adsorbent material put into the water in excess of 1:1.8 rate can float on the water, but it is harmless for the living creatures, does not mean additional polluting factor.

The bound oil contamination is made harmless by burning or centrifuging. It can be stored in small quantities, should be treated as hazardous waste, which however does not pollute the environment any more. In big quantities the bound oily contamination can be either burnt or retrieved by centrifuging.

The advantages of the solution according to the invention:

The above aims can be achieved with the adsorbent material developed by us, because its oil adsorbing and binding capacity is significantly bigger then the materials in the state of the art. Compared with the mass of the polluted material much less quantity is needed than in case of sand or other materials. The adsorbent material adsorbs the oil and binds it, so no oil pollution is left. The adsorbent material saturated with oil can be removed from roads by sweeping, so no risk of accidents. The adsorbent material is hydrophobic to a great extent, so it binds the oil pollution only, it does not mix with water or get into reaction with it.

The application requires much less physical labor, because the binding effect of the adsorbent material comes into force without human intervention as well. To accelerate the process it is possible to use human intervention for moving the adsorbent material, but the extent of it is considerably smaller than with sand. The adsorbent material saturated with oil can be burnt. In case of big quantities further utilization of the heat can mean re-use or recycling. Due to its strong hydrophobic character it can be well applied on water and on watery surface as well.

Additional advantages of the adsorbent material according to the invention:

The adsorbent material can prevent spreading of the oil slick when poured around the oil slick in clear water, so it remains around 1 mm thick—here the adsorbent material behaves as the polluted water, and at the same time starts the binding of the oil as well. This latter process can be accelerated by mixing to a great extent, which is an important aspect, because the time factor is of great significance these cases.

It lets oxygen through the water (from the atmosphere to the water), respectively during photosynthesis the gases developing in the water (from the water to the atmosphere), acting as an efficient auxiliary device in regulating eutrophication. The adsorbent material according to the invention can be efficiently used in extinguishing oil flames, as it adsorbs oil by this removing one of the conditions of burning, the combustible material.

The invention claimed is:

1. A method for preparing a hydrophobic adsorbent material having the ability to separate oil from water and/or binding oil, comprising adding with steady mixing 3.45-11.75 mass percent of an auxiliary material, which comprises 2.95-7.75 mass percent of a liquid adsorbent agent and 1.2-3.4 mass percent of liquid catalyst, to 29.3-86.2 mass percent of ground and dried CaO, then during additional steady mixing adding 18.25-55.75 mass percent of water and stabilizer, whereby a chemical reaction the adsorbent material is achieved, followed by dehydrating and allowing said material to cool and rest for 24-48 hours, wherein the composition of the adsorbent agent is:

| component | volume percentage |
|---|---|
| Palmitic acid | 2.75-6.75% |
| Stearic acid | 0.75-3.75% |
| Oleic acid | 30-97.50% |
| Linoleic acid | 9.00-33.00% |
| Linolenic acid | 3.50-15% |
| Erucidic acid | <3% | the composition of the catalyst is:

| component | volume percentage |
|---|---|
| Ethyl alcohol | 45-97% |
| Denaturant | 0.1-0.50% |
| Catalyst additive | 3.00-54.5% | in which the composition of the catalyst additive is:

| component | volume percentage |
|---|---|
| Benzine | 33.75%-90% |
| Benzol | 10-30% |
| Pyridine | 3.75-11.25% |
| Methanol | 2.5-7.5% | and the stabilizer is potassium silicate with a quantity of 0.01-0.002 mass % proportioned to the total mass of materials.

2. A method according to claim 1, wherein the composition of the adsorbent agent is:

| component | volume percentage |
|---|---|
| Palmitic acid | 2.75-6.75% |
| Stearic acid | 1.15-3.25% |
| Oleic acid | 41-87.5% |
| Linoleic acid | 11.6-28.6% |
| Linolenic acid | 4.85-13.15% |
| Erucidic acid | <1.5% | and the composition of the catalyst is:

| component | volume percentage |
|---|---|
| Ethyl alcohol | 63-95% |
| Denaturant | 0.14-0.3% |
| Catalyst additive | 4.7-36.7% | in which the composition of the catalyst additive is:

| component | volume percentage |
|---|---|
| Benzine | 47.25-80% |
| Benzol | 14-26% |
| Pyridine | 5.25-9.75% |
| Methanol | 3.5-6.5%. |

3. A method according to claim 1, wherein
the amount of ground and dried CaO is 56.8 mass percent,
the amount of liquid adsorbent agent is 4.5 mass percent,
the amount of catalyst is 2.2 mass percent, and
the amount of water is 36.5 mass percent,
wherein the composition of the adsorbent agent is:

| component | volume percentage |
|---|---|
| Palmitic acid | 4-5% |
| Stearic acid | 1.5-2.5% |
| Oleic acid | 60-65% |
| Linoleic acid | 18-22% |
| Linolenic acid | 7-10% |
| Erucidic acid | <2% | and the composition of the catalyst is:

| component | volume percentage |
|---|---|
| Ethyl alcohol | 90% |
| Denaturant | 0.2% |
| Catalyst additive | 6-9.8% | and the composition of the catalyst additive is:

| component | volume percentage |
|---|---|
| Benzine | 67.5% |
| Benzol | 20% |
| Pyridine | 7.5% |
| Methanol | 5%. |

4. A method according to claim 1, wherein a 2:1 volume rate emulsion of physically mixed liquid adsorbent agent and liquid catalyst is used.

5. A method according to claim 1, which takes place in a rotary mixer.

6. A method according to claim 1, wherein the auxiliary material is added by feeding at 3-6 bar pressure.

7. A method according to claim 1, wherein even blending is ensured during the chemical reaction taking place after feeding the water.

8. A method, according to claim 1, wherein the particle size of ground CaO is 0.05-50 mm.

9. A hydrophobic adsorbent material having the ability to separate oil from water and/or binding oil, which has been prepared by a method according to claim 1.

10. A method for removing oil contamination from a solid surface, comprising applying an adsorbent material according to claim 9 to the oil contamination whereby solid granules form that are removed from said surface.

11. A method for removing oil that became solid in the environment, which environment is optionally of an oil producing plant, oil-rig, oil refinery, loading dock, or repair shop, comprising applying a liquid hydrocarbon, which is optionally an oil, to the oil that became solid thereby loosening the solid oil, and applying an adsorbent material according to claim 9, whereby the loosened solid oil is bound to the adsorbent material, followed by removing said bound oil.

12. A method for removing oil contamination from a hazardous place, which is optionally a power station, nuclear power plant, or a site of reparation or maintenance work, comprising applying an adsorbent material according to claim 9 to the oil contamination whereby the oil contamination is adsorbed, or applying said adsorbent material to an expected place of oil contamination as protective cover, which protective cover upon oil contamination would adsorb said oil contamination, and removing the adsorbed oil contamination.

13. A method for removing oil from an oil slick in water, comprising applying an adsorbent material according to claim 9 to the surface of the water at a rate of 1:<1.8 in proportion of the mass of oil, whereby the adsorbent material adsorbs the oil and remains floating on the water, and removing the adsorbed oil, optionally by a floating dam or by pumping, and optionally separating the adsorbed oil from the water in a container.

14. A method for removing oil from water, comprising applying an adsorbent material according to claim 9 to the surface of the water at a rate of 1:1.8 or at a greater rate in proportion of the mass of oil, whereby the adsorbent material adsorbs the oil and sinks below the surface of the water and forms a material at the bottom of the water that sets, compacts and solidifies.

15. A method according to claim 10, further comprising burning or centrifuging or storing as hazardous waste the solid granules.

16. A method according to claim 1, wherein the amount of ground and dried CaO is 39.1-72.84 mass percent.

17. A method according to claim 1, wherein the amount of auxiliary material is 4.12-9.21 mass percent.

18. A method according to claim 1, wherein the amount of liquid adsorbent agent is 4.15-5.85 mass percent.

19. A method according to claim 1, wherein the amount of catalyst is 1.34-1.76 mass percent.

20. A method according to claim 1, wherein the amount of water is 26.55-48.45 mass percent.

* * * * *